United States Patent [19]

Iimura

[11] Patent Number: 5,016,988

[45] Date of Patent: May 21, 1991

[54] LIQUID CRYSTAL DISPLAY DEVICE WITH A BIREFRINGENT COMPENSATOR

[75] Inventor: Haruo Iimura, Yokohama, Japan

[73] Assignee: Ricoh Company, Ltd., Tokyo, Japan

[21] Appl. No.: 475,214

[22] Filed: Feb. 5, 1990

[30] Foreign Application Priority Data

Feb. 10, 1989 [JP] Japan .................................. 1-32219
Dec. 20, 1989 [JP] Japan .................................. 1-330244

[51] Int. Cl.$^5$ ............................................ G02F 1/133
[52] U.S. Cl. .................................. 350/347 R; 350/337
[58] Field of Search ................. 350/347 R, 347 E, 337

[56] References Cited

U.S. PATENT DOCUMENTS

| | | | |
|---|---|---|---|
| 4,586,790 | 5/1986 | Umeda et al. | 350/337 |
| 4,813,770 | 3/1989 | Clerc et al. | 350/347 E |
| 4,844,569 | 7/1989 | Wada et al. | 350/347 E |
| 4,889,412 | 12/1989 | Clerc et al. | 350/347 R |
| 4,957,349 | 9/1990 | Clerc et al. | 350/347 R |

FOREIGN PATENT DOCUMENTS 0297841 1/1989 European Pat. Off. ............ 350/337

Primary Examiner—Stanley D. Miller
Assistant Examiner—Anita P. Gross
Attorney, Agent, or Firm—Oblon, Spivak, McClelland, Maier & Neustadt

[57] ABSTRACT

Disclosed herein is a liquid crystal display device comprising (1) a liquid crystal cell having a structure in which liquid crystal molecules in the liquid crystal layer sandwiched between substrates are oriented substantially in parallel to the surface of the substrate and twisted at an angle of from 120° to 360° in the thickness direction of the liquid crystal layer when the voltage is not applied, (2) a pair of polarizers disposed so as to sandwich the liquid crystal cell therebetween and (3) a birefringence layer disposed between the liquid crystal layer and at least one of the polarizers. The liquid crystal display device can provide black and white display of excellent visual angle characteristic and of excellent quality. Furthermore, the maximum, minimum, and perpendicular refractive indexes, $n_x$, $n_y$, and $n_z$, respectively, of the birefringence layer satisfy the following relationship:

$$n_y < n_z < n_x.$$

2 Claims, 3 Drawing Sheets

LIQUID CRYSTAL DISPLAY DEVICE WITH A BIREFRINGENT COMPENSATOR

BACKGROUND OF THE INVENTION

The present invention concerns a liquid crystal display device having a liquid crystal layer sandwiched between substrates and a pair of polarizers disposed at outside of the liquid crystal layer, and having a structure in which the liquid crystal is oriented substantially in parallel to the surface of the substrate and twisted at an angle of from 120° to 360° in the thickness direction of the liquid crystal layer when the voltage is not applied.

The liquid crystal display mode mainly used so far is referred to as a twisted nematic (TM) type having a structure in which liquid crystal molecules are twisted by about 90° between upper and lower substrates, and it utilizes the rotation of a polarization plane caused by the liquid crystal and elimination of such effect upon the application of voltage. The display mode is satisfactory in low time-division driving used for electronic digital clocks or pocket calculators but involves a drawback that the contrast is lowered or the visual angle is narrowed if it is driven at high time-division in order to increase the display capacity. The drawback is due to the fact that the ratio of the voltage applied on a selected point to the voltage applied on a nonselected point approaches 1 upon the high time-division driving.

In order to attain a display device of high contrast and wide visual angle, it is necessary to reduce the steepness γ represented by the ratio ($V_{50}/V_{10}$) of the voltage ($V_{50}$) which changes the relative transmittance of the device by 50% to the voltage ($V_{10}$) which changes the relative transmittance by 10%.

In the case of twisted nematic type, the γ value is about 1.13. For reducing the γ value, it has been proposed a method of increasing the twist angle of liquid crystal molecules and shifting the polarization axis from the orientation direction of liquid crystal, which is referred to as a SBE mode or STN mode. With such a method, the γ value can be reduced to less than 1.1 and high time-division driving at about 1/400 duty is possible.

However, since such a method utilizes the coloration due to birefringence and the change thereof with the voltage application, it is theoretically difficult to obtain black and white display and the transmission light or reflection light of the liquid crystal cell is colored to thereby form a display on a colored background. In order to avoid such coloration, it has also been known to overlay another color-eliminating liquid crystal cell having a reverse twist direction of liquid crystal molecules on a STN type liquid crystal cell [refer, for example, to H. Watanabe et al., Society for Information Display 88 "Digest", PP. 416–419 (1988)]. In this case, however, since two liquid crystal cells are stacked, the cost is increased and the entire thickness and weight are also increased, and further, there is a drawback that displayed characters give an impression of floating since the distance between the polarization plate and the display liquid crystal layer is increased.

As a color-compensation plate for eliminating the coloration of the STN type liquid crystal display device, it has also been known a method of using a birefringence layer instead of the another liquid crystal cell [refer, for example, to H. Odai, et al. 1988, "International Display Research Conference", PP. 195–198 and Japanese Patent Application Laid-Open Sho 64-519 (1989)].

Such a method of using the birefringence layer is more useful industrially than the method of stacking two liquid crystal cells, since increase of the thickness and weight is not so much and the liquid crystal display device can be produced at a low cost. However, in the STN type liquid crystal display device color-compensated by using the birefringence layer there is a problem to be dissolved that the brightness and color are changed depending on the visual angle direction.

The present inventors have made a study for overcoming the foregoing problems and, as a result, have found that an excellent liquid crystal display device can be obtained by controlling the twist angle of liquid crystals in a liquid crystal cell, the maximum refractive index direction x, maximum refractive index $n_X$ and minimum refractive index $n_Y$ in the birefringence layer face parallel to the substrate surface and the refractive index $n_Z$ of the birefringence layer in the thickness direction each in a predetermined range.

That is, the object of the present invention is to provide a liquid crystal display device of excellent visual angle characteristic and capable of black and white display at a low cost.

SUMMARY OF THE INVENTION

In an aspect of the present invention, there is provided a liquid crystal display device comprising:

(1) a liquid crystal cell having a structure in which a liquid crystal layer is sandwiched between a pair of substrates each having at least one electrode, and liquid crystal molecules in the liquid crystal layer are oriented substantially in parallel to the surface of the substrate and twisted at an angle of from 120° to 360° in the thickness direction of the liquid crystal layer when the voltage is not applied, (2) a pair of polarizers disposed so as to sandwich the liquid crystal cell therebetween and, (3) a birefringence layer disposed between the liquid crystal layer and at least one of the polarizers, wherein the angle ($\beta_1$) of the polarized light transmission axis ($P_1$) of the polarizer adjacent to the birefringence layer formed to the maximum refractive index direction (x) in the birefringence layer face parallel to the substrate surface is in the range of from 20° to 70° (as an absolute value), and the maximum refractive index $n_x$ and the minimum refractive index $n_y$ in the birefringence layer face parallel to the substrate surface, and the refractive index $n_z$ of the birefringence layer in the direction perpendicular to the substrate surface have a relationship represented by the following formula (I):

$$n_Y < n_Z < n_X \quad (I)$$

DETAILED DESCRIPTION OF THE INVENTION

Figure 1:
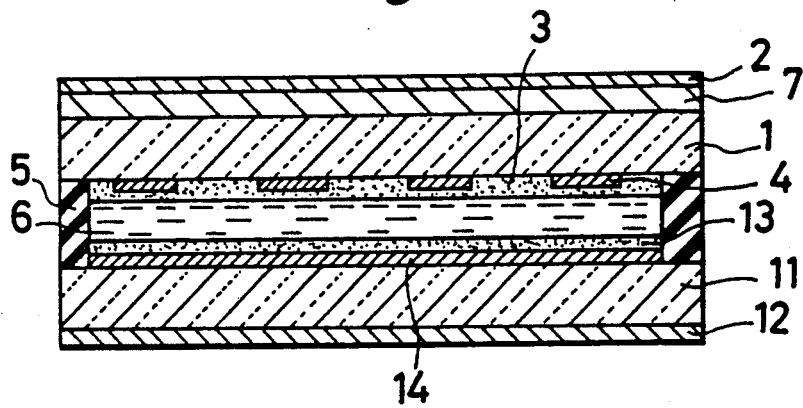
FIG. 1 is a cross sectional view for a constitutional embodiment of a liquid crystal display device according to the present invention.

The present invention is to be described referring to the drawings.

FIG. 1 is a cross sectional view illustrating one embodiment for the constitution of a liquied crystal display device according to the present invention. In the figure, there are shown a first substrate 1 and a second substrate 11, each of which has orientation films 3, 13 having been subjected to orientation treatment and transparent electrodes 4, 14 respectively. Both of the substrates 1 and 11 are opposed with a gap, and a liquid crystal 6 is sealed therebetween to form a liquid crystal cell. Reference numeral 5 represents a sealing agent. The liquid crystal cell is sandwiched between a first polarizer 2 and a second polarizer 12, and a birefringence layer 7 is disposed between the substrate 1 and the polarizer 2, to constitute a liquid crystal display device. The liquid crystal display device can be used also as a reflection type by disposing a reflection plate at outside of one of the polarizers.

The orientation treatment in the first substrate 1 and the second substrate 11 of the liquid crystal display device according to the present invention is carried out such that liquid crystal molecules are oriented substantially in parallel to the substrate surface when the voltage is not applied, and the liquid crystal molecules are oriented preferentially along the orientation treatment direction. In this case, the term "substantially in parallel to" referred to the orientation of the liquid crystal molecules means that the angle of inclination of the liquid crystal molecules to the substrate surface is in the range of about from 0° to 30°.

Figure 2:
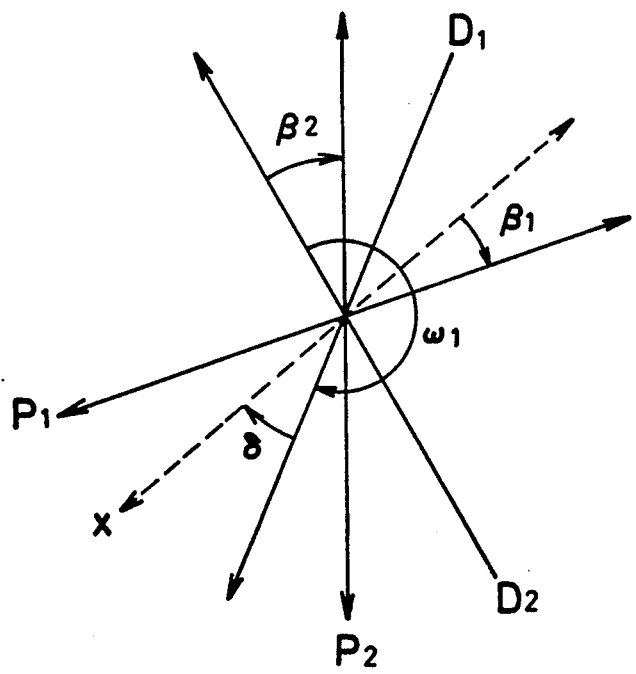
FIG. 2 is an explanatory view illustration angular relationship among the liquid crystal orientation direction, the polarized light transmission axis direction, etc. in a liquid crystal display device according to the present invention.
Figure 3:
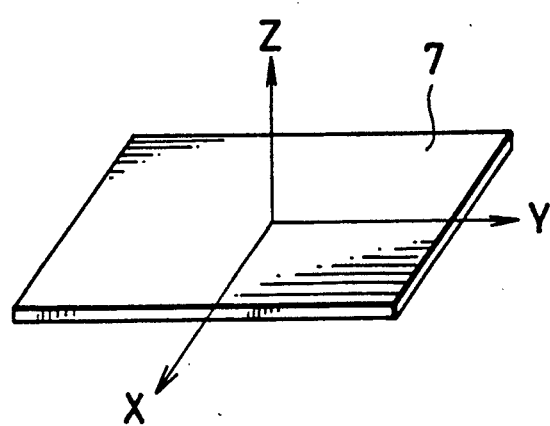
FIG. 3 is a view illustrating the refractive index directions of the birefringence layer.

FIG. 2 shows a definition for the angle regarding the present invention. In the figure, $D_1$ and $D_2$ show directions obtained by projecting liquid crystal molecules on the first substrate 1 and the second substrate 11 respectively to the lower substrate 11 surface, in which arrows show an upward direction of the liquid crystal molecules slightly inclined to the substrate 11 surface when the liquid crystal molecules are projected. The liquid crystal layer has a structure in which liquid crystal molecules are twisted at the angle of $\omega_1$ between $D_1$ and $D_2$. Thus, $\omega_1$ is a twist angle determined by the orientation treatment and the orientation can be controlled by applying known skewed vapor deposition on the substrate or by forming an organic or inorganic coating layer on the substrate and thereafter rubbing the layer with cotton cloth etc. The liquid crystal used in the present invention is preferably prepared by adding cholesteric liquid crystal or chiral nematic liquid crystal to nematic liquid crystal having a positive dielectric anisotropy and controlling the twist pitch of liquid crystal in an appropriate distance. In this case, if $\omega_1$ is too small, the steepness is worsened and the time-division driving characteristic is lowered. Further, if $\omega_1$ is too large, scattered tissue is formed in the cell when the voltage is applied, and the display quality is lowered. So, the both cases are not preferable. Therefore, it is necessary that $\omega_1$ is not less than 120° and not more than 360°.

In FIG. 2, the device is so constituted that the twist direction of liquid crystal molecules advancing from the second substrate (lower substrate) to the first substrate (upper substrate) is clockwise when viewing the cell from the side of the first substrate to the side of the second substrate. However, the twist direction may be anticlockwise according to the direction of the orientation treatment, or the selective use of cholesteric liquid crystal or chiral nematic liquid crystal.

In a case where a birefringence layer is disposed between the substrate and the polarizer as in the embodiment for the constitution of the liquid crystal display device according to the present invention, light-transparent glass, plastic, etc. are used as the substrates 1, 11. In the case of using a plastic substrate, the thickness of the substrate can easily be reduced to less than 0.2 mm and, accordingly, the display device can be made extremely thin and at a light weight. Further, since the substrate is thin, a display device of a wide visual angle without display of double images can be obtained.

As the orientation film 3, 13 used in the present invention, there may be used a high polymer film made of polyamide, polyimide etc. having been subjected to rubbing treatment or a skewed vapor deposition film of $SiO_2$, MgO, $MgF_2$, etc. formed on the substrate surface.

Further, as another embodiment for the constitution of the liquid crystal display device according to the present invention, the substrate per se can serve also as a birefringence layer. In this case, the layer structure of the device is identical with that of the conventional STN type liquid crystal display device except that at least one of the substrates 1 and 11 has a birefringent property. The substrate, which serves also as a birefringence layer, may be constituted of birefringent material alone or the birefringent material laminated with other film or glass.

As a further embodiment for the constitution of the liquid crystal display device according to the present invention, the birefringence layer can also be incorporated as a constituent element of the polarization plate per se. A usual polarizer utilizing the dichroic property of iodine or pigment has a structure in which a stretched film provided with polarizing property by adsorption of iodine or pigment to the film is sandwiched between other two films for protection. However, in the present invention the birefringence layer may be disposed between the protection film on the side of the liquid crystal layer and the stretched film, or the protection film per se on the side of the liquid crystal can be constituted of a birefringence layer.

As has been described above, the birefringence layer used in the present invention may be disposed at any position so long as it is between the liquid crystal layer and the polarizer.

It is necessary for the birefringence layer used in the present invention to has a three-dimensional refractive index anisotropy as defined later and a light transparency.

For example, as the birefringence layer, an organic or inorganic high polymer film having the specific three-dimensional refractive index anisotropy and transparecy is used. Further, as the birefringence layer, the material obtained by cutting off a crystalline thin plate along the face parallel to its optical axis so as to has the above specificity is also applicable. In these materials, the high polymer is most preferably used, because the material having a large area can be easily obtained. Further, the birefringence layer used in the present invention may be a laminated material composed of two or more layers of birefringent material.

The refractive index anisotropy Δn(BM) of the birefringence layer is defined as a difference between (1) a refractive index as to a polarized light parallel to the maximum refractive index direction (x direction) in the birefringence layer face parallel to the substrate surface and (2) a refractive index as to a polarized light perpendicular to the x direction in the layer face. It is necessary that a polarized light transmission axis of a polarizer adjacent to the birefringence layer is shifted from the x direction of the birefringence layer such that the transmission axis is maintained to be neither parallel nor perpendicular to the x direction. If the x direction of the birefringence layer is parallel or perpendicular to the polarized light transmission axis of a polarizer adjacent to the birefringence layer, the effect of the present invention can not be developed at all and the display is observed on the colored background. It is necessary that the inclination angle (absolute value for angle $\beta_1$ shown in FIG. 2) of the polarized light transmission axis of the polarizer adjacent to the birefringence layer formed to the x direction of the birefringence layer is in the range of from 20° to 70°. Further, the angle $\beta_1$ is in the range of preferably, from 30° to 60°.

As shown in FIG. 2, the transmission axis $P_2$ of the polarizer 12 adjacent to the second substrate 11 forms the angle of $\beta_2$ to the orientation direction $D_2$ of the liquid crystal on the second substrate 11.

Further, the x direction in the birefringence layer 7 forms an angle δ to the liquid crystal orientation direction $D_1$ on the substrate 1 adjacent to the birefringence layer 7. Further, the transmission axis $P_1$ of the polarizer 1 adjacent to the birefringence layer 7 is disposed to form an angle $\beta_1$ to the x direction in the birefringence layer 7. In this case, positive or negative of the each angle is decided such that the twist direction of the liquid crystal molecules advancing from the substrate 11 to the substrate 1 is positive.

The angle of the x direction formed to the liquid crystal orientation direction $D_1$ (absolute value for the angle δ) in the liquid crystal display device according to the present invention is in the range of (1) usually from 60° to 120°, preferably from 70° to 110° when the angle $\beta_2$ is from 20° to 70° (as the absolute value) and (2) usually from 20° to 130°, preferably from 40° to 110° when the angle $\beta_2$ is from 0° to 25° (as the absolute value).

Although description has been made referring to the transmission axis of the polarizer in FIG. 2, the situation is quite identical also referring to the absorption axis of the polarizer.

The direction perpendicular to the x direction in the birefringence layer 7 face parallel to the substrate surface is defined as a y direction and the direction perpendicular to both of x and y directions, that is, the thickness direction of the birefringence layer 7 is defined as a z direction, and the refractive indexes in these directions are defined as $n_X$, $n_Y$ and $n_Z$ respectively.

Figure 4:
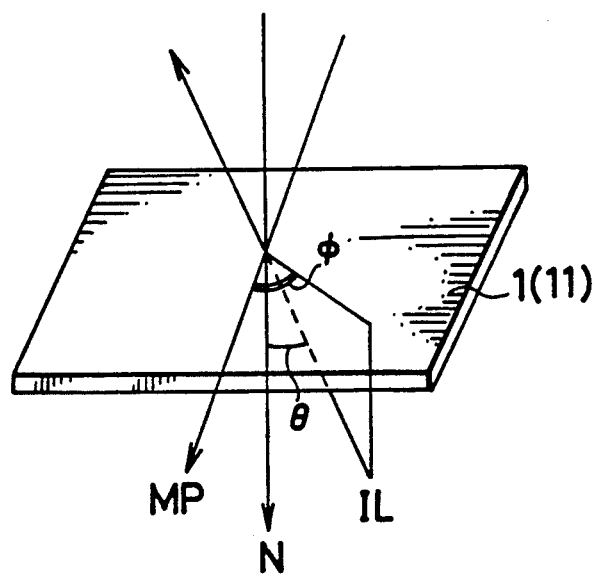
FIG. 4 is a view illustrating the definition of the visual angle direction.

Further, the visual angle direction is defined as shown in FIG. 4. That is, it is defined that the direction perpendicular to a plane of the substrate is N, the angle between the direction N and an incident light direction is θ and the angle between the projection of the incident light to the plane of the substrate and direction MP is φ. Accordingly, the visual angle direction is determined with θ and φ.

Description will now be made for the results of examination in the visual angle characteristic of the liquid crystal display device constituted as shown in FIG. 1. Table-1 shown typical characteristic values for the cell parameter, the angle of the polarization plate and the birefringence layer of the liquid crystal display device.

TABLE 1

| $\omega_1$ | $\beta_1$ | $\beta_2$ | Δn(LC).d(LC) | δ | Δn(BM).d(BM) | $n_x$ | $n_y$ |
|---|---|---|---|---|---|---|---|
| 200° | −45° | 45° | 0.915 | 90° | 0.825 | 1.5214 | 1.5052 |

Figure 5:
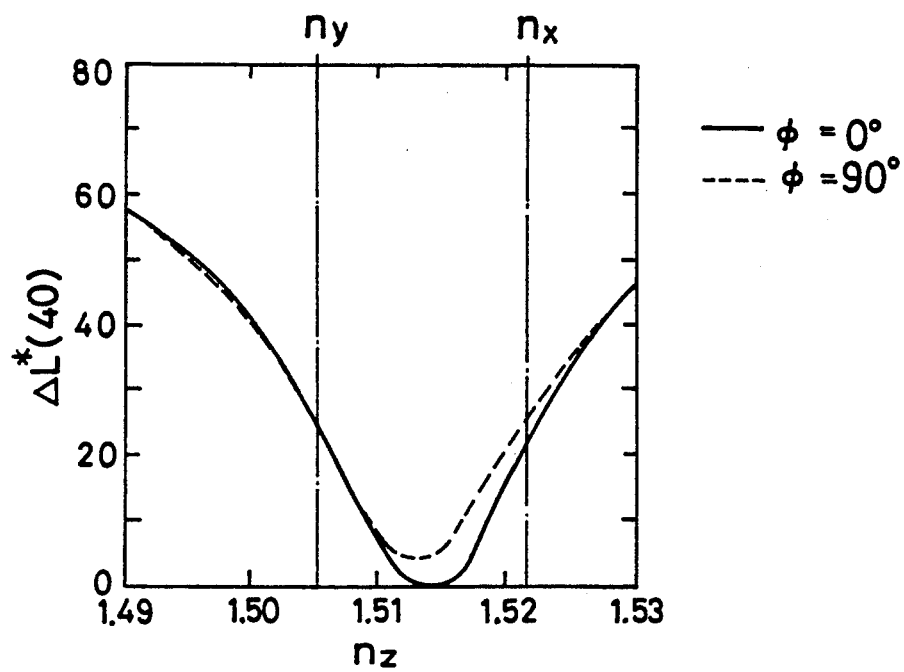
FIG. 5 is a view illustrating $n_Z$ dependency of the brightness difference $\Delta L^*$ between the both cases of viewing the liquid crystal display device from the front and from the oblique direction.
Figure 6:
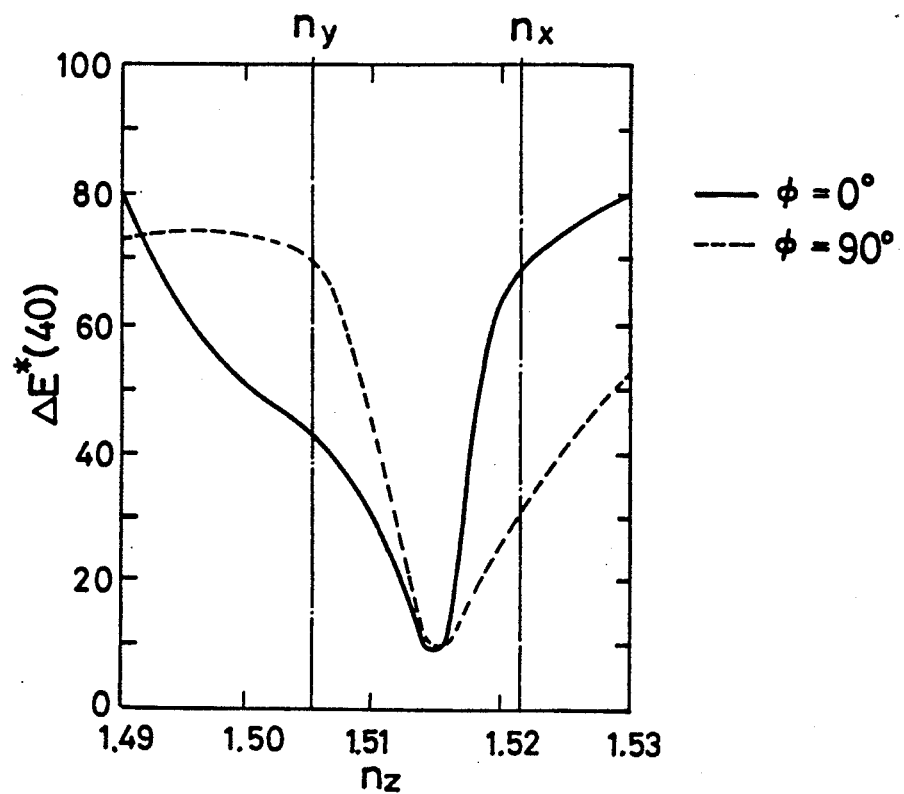
FIG. 6 is a view illustrating $n_Z$ dependency of the color difference $\Delta E^*$ between the both cases of viewing the liquid crystal display device from the front and from the oblique direction.

In Table-1, Δn(LC).d(LC) is the product of the liquid crystal refractive index anisotropy Δn(LC) and the thickness d(LC) of the liquid crystal layer, and Δn(BM).d(BM) is the product of the refractive index anisotropy Δn(BM) ($=n_X-n_Y$) in the birefringence layer face and the thickness d(BM) of the birefringence layer. For the example shown in Table-1, FIG. 5 and FIG. 6 shown respectively changes of the brightness difference ΔL*(40) and the color difference ΔE*(40) between the case as viewed from the front (θ=0°) and the case as viewed from the oblique direction (θ=40°) when the angle φ is 0° and 90°, the refractive index $n_X$, $n_Y$ in the birefringence layer face is fixed and the refractive index $n_Z$ in the thickness direction is varied while using the example of Table 1. The ΔL*(40) and ΔE*(40) are defined as in the following formulae (II) and (III).

$$\Delta L^*(40) = L^*(40) - L^*(0) \quad \text{(II)}$$
$$\Delta E^*(40) = [(L^*(40) - L^*(0))^2 + (u^*(40) - u^*(0))^2 + (v^*(40) - v^*(0))^2]^{\frac{1}{2}} \quad \text{(III)}$$

where L*(0), u*(0), v*(0) and L*(40), u*(40), v*(40) are respectively L*, u* and v* when the visual angle θ is 0° and 40° (CIELUV color system).

As shown in FIG. 6 and FIG. 6, for reducing the differences of the brightness and the color between the case as viewed from the front and the case as viewed from the oblique direction, it is necessary that $n_Z$ is set as a value between $n_X$ and $n_Y$. If $n_Z$ is larger than $n_X$ or smaller than $n_Y$, change of the brightness and the color depending on the visual angle is increased. Accordingly, the liquid crystal display device according to the present invention, the values for $n_X$, $n_Y$ and $n_Z$ have to be set so as to satisfy the following formula (I):

$$n_Y < n_Z < n_X \quad \text{(I)}$$

Further the values for $n_X$, $n_Y$ and $n_Z$ are preferred to satisfy the following equation (I)'

$$n_Y + \tfrac{1}{4}(n_x - n_y) < n_z < n_x - \tfrac{1}{4}(n_x - n_y) \quad \text{(I)'}$$

By controlling the refractive index in the birefringence layer as mentioned above, it is possible to improve the visual angle characteristic of the STN type liquid crystal display device color-compensated by using the birefringence layer.

On the other hand, the values for the above $n_x$, $n_y$ and $n_z$ in the conventional stretched (uniaxial drawing), high polymer film has the following relationship:

$$n_z < n_y < n_x.$$

Accordingly, such a conventional stretched film can not be used in the liquid crystal display device of the present invention.

Although the descriptions have been made to the example shown in Table-1, the method is not always restricted to the example of Table-1, but it can be applied generally to STN type liquid crystal display devices color-compensated by using a birefringence layer.

The present invention is to be described more in details referring to examples but the invention is not restricted to the example.

EXAMPLE 1

A liquid crystal cell having transparent electrodes is manufactured such that the twist angle $\omega_1$ of the liquid crystal between the upper and lower glass substrates is 200° and $\Delta n(LC).d(LC)$ is 0.92 μm. In this case, nematic liquid crystal ZLI 2293 having positive dielectric anisotropy to which chiral nematic liquid crystal S811 is added is used as the liquid crystal. The orientation treatment in the liquid crystal is carried out by a rubbing treatment of polyimide films each disposed on the upper and lower glass substrates. A neutral gray polarization plate provided with a reflection plate is disposed below the cell such that the transmission axis $P_2$ forms the angle of 45° to the rubbing direction $D_2$ of the lower substrate ($\beta_2 = 45°$). A polymer film [$\Delta n(BM).d(BM) = 0.834$ μm, $n_X = 1.5323$, $n_Y = 1.5156$ and $n_Z = 1.5204$] is disposed as a birefringence layer on the upper substrate such that the X direction thereof is perpendicular to the rubbing direction $D_1$ of the upper substrate ($\delta = 90°$) and further thereover, a polarization plate is disposed such that the transmission axis $P_1$ forms the angle of $-45°$ to the X direction of the film ($\beta_1 = -45°$).

The liquid crystal display device constituted as described above is black when the voltage is not applied and turned white upon the application of voltage and has a excellent visual angle characteristic due to reduction of changes of brightness and color depending on the visual angle direction.

EXAMPLE 2

The liquid crystal display device is manufactured in the same method as in Example 1 except that the upper polarization plate is disposed such that the angle $\beta_1$ is 45° instead of $-45°$. The liquid crystal display device thus constituted is white when the voltage is not applied and turns black upon the application of voltage, and shows reduction of the brightness and color changes depending on the visual angle direction as in Example 1.

EXAMPLE 3

In the same manner as in Example 1, a liquid crystal cell having the twist angle $\omega_1$ of 180° and $\Delta n(LC).d(LC)$ of 0.72 μm is manufactured. A lower polarization plate is disposed below the liquid crystal cell such that the polarization plate angle $\beta_2$ is 45°. A polymer film [$\Delta n(BM).d(BM) = 0.63$ μm, $n_X = 1.604$, $n_Y = 1.5521$, and $n_Z = 1.5817$] is disposed as a birefringence layer above the cell such that the X direction is perpendicular to the rubbing direction $D_1$ of the upper substrate. The polarized light transmission axis $P_1$ of the upper polarization plate is disposed so as to form the angle $\beta_1$ of $-45°$ of 45° to the X direction of the birefringence layer. The device shows black or white color when the voltage is not applied, according to the respective disposition (angle $\beta_1$) of the polarization plate. Further, the device turns white or black when the voltage is applied, respectively. It shows reduction of brightness and color changes depending on the visual angle direction and has excellent visual angle characteristic.

EXAMPLE 4

In the same manner as in Example 1, the liquid crystal cell having the twist angle $\omega_1$ of 240° and $\Delta n(LC).d(LC)$ of 1.0 μm is manufactured. The same polymer film as used in Example 1 except for having different thickness [$\Delta n(BM).d(BM) = 0.94$ μm] is used as a birefringence layer on the liquid crystal cell, and the display device is constituted in the same manner ($\beta_2 = 45°$, $\delta = 90°$, $\beta_1 = 45°$). The liquid crystal display device also shown black and white display and shows reduction of the brightness and color changes depending on the visual angle direction.

EXAMPLE 5

A liquid crystal cell is manufactured in the same manner as in Example 1 except for using a plastic film made of polyethersulfone as a substrate. The device also shows black and white display similar to that using the glass substrate and shows an excellent visual angle characteristic.

As has been described above, it is possible, by the use of the above-mentioned constitution to improve the visual angle characteristic of the STN type liquid crystal display device color-compensated by using a birefringence layer, thereby obtaining a black and white display liquid crystal display device of excellent display quality.

EXAMPLE 6

In the same manner as in Example 1, the liquid crystal cell having the twist angle $\omega_1$ of 180° and $\Delta n(LC).d(LC)$ of 0.6 μm is manufactured. Two sheets of the same polymer film as used in Example 3 except for having different thickness [respectively, $\Delta n(BM).d(BM) = 0.39$ μm] are laminated and the thus laminated film is used as a birefringence layer on the liquid crystal cell, and the display device is constituted in the same manner ($\beta_2 = 0°$, $\delta = 70°$, $\beta_1 = 45°$). The liquid crystal display device also shows black and white display and shows reduction of the brightness and color changes depending on the visual angle direction, and has excellent visual angle characteristic.

What is claimed is:

1. A liquid crystal display device comprising:
   (1) a liquid crystal cell having a structure in which a liquid crystal layer is sandwiched between a pair of substrates each having at least one electrode, and liquid crystal molecules in said liquid crystal layer are oriented substantially in parallel to the surface of said substrate and twisted at an angle of from 120° to 360° in the thickness direction of said liquid crystal layer when the voltage is not applied,
   (2) a pair of polarizers disposed so as to sandwich said liquid crystal cell therebetween, and (3) a birefringence layer disposed between the liquid crystal layer and at least one of the polarizers, wherein the angle ($\beta_1$) of the polarized light transmission axis ($P_1$) of said polarizer adjacent to said birefringence layer formed to the maximum refractive index direction (X) in said birefringence layer face parallel to said substrate surface is in the range of from 20° to 70° (as an absolute value), and the maximum refractive index $n_x$ and minimum refractive index $n_y$ in said birefringence layer face parallel to said substrate surface, and the refractive index $n_Z$ of said birefringence layer in the direction perpendicular to said substrate surface have a relationship represented by the following formula (I):

$$n_Y < n_Z < n_X \qquad (I).$$

2. A liquid crystal display device as defined in claim 1, wherein $n_x$, $n_y$ and $n_z$ have a relationship represented by the following equation (I)':

$$n_y + \tfrac{1}{4}(n_x - n_y) < n_z < n_x - \tfrac{1}{4}(n_x - n_y) \qquad (I)'$$

* * * * *